Dec. 7, 1954  L. R. BONN  2,696,278
TWO-STAGE SHOCK ABSORBER
Filed Nov. 5, 1951
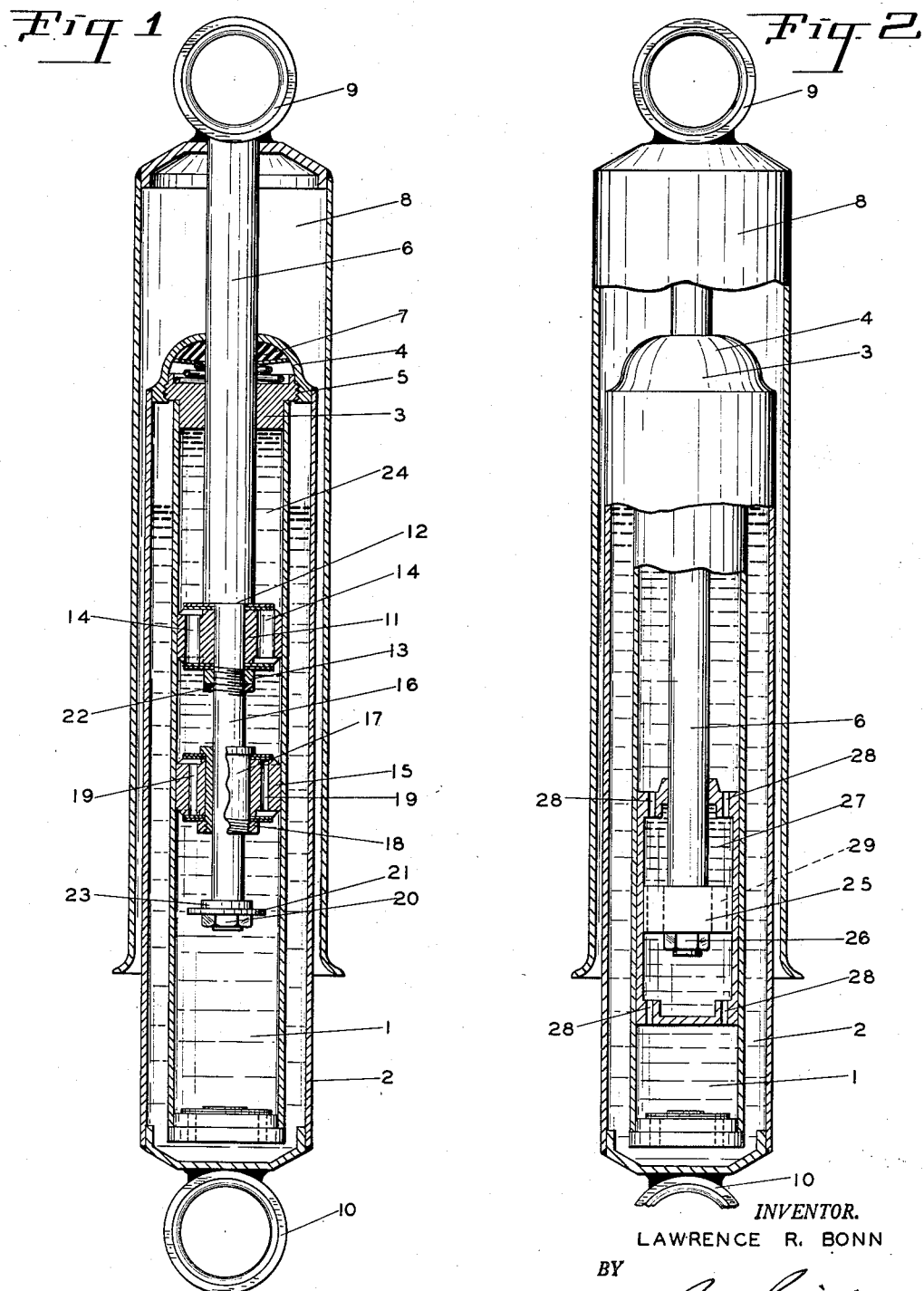
INVENTOR.
LAWRENCE R. BONN
BY
ATTORNEY

United States Patent Office 2,696,278
Patented Dec. 7, 1954

2,696,278

TWO-STAGE SHOCK ABSORBER

Lawrence R. Bonn, Salem, Oreg.

Application November 5, 1951, Serial No. 254,871

4 Claims. (Cl. 188—88)

My invention relates to shock absorbers and is particularly adapted to shock absorbers used on vehicles and the like.

The primary object of my invention is to incorporate in a shock absorber a light control for relatively smooth roads, and a heavy control automatically taking up for rough roads.

The purpose of the light control feature is to permit a softer ride on the average good road, the heavier control automatically coming in to control of the shock absorber when rough roads are encountered.

These and other incidental objects will be apparent in the drawing, specification and claims.

Referring to the drawing:

Figure 1 is a sectional view of a conventional shock absorber having my new and improved light control feature incorporated therein.

Figure 2 is a modified form of my light control mechanism.

Referring more specifically to the drawing:

The shock absorber consists of the usual pressure tube 1, mounted within the reservoir tube 2 through the usual bearing 3. The bearing 3 being threaded into the cap 4 by way of the threads 5. A piston rod 6 works through the bearing 3 and stuffing box 7 of the usual construction. Fixedly connected to the upper end of the rod 6 is the dust shield 8, the upper end of the rod 6 terminating in the ring or eye 9 adapted to be connected to the frame of the vehicle. Located on the lower end of the reservoir 2 is an oppositely disposed eye or ring 10, adapted to be connected to the axle of the vehicle in the usual manner.

11 indicates a piston, positioned against a shoulder 12 on the rod 6 and locked in position against said shoulder by a lock nut 13. This piston has relatively large ports 14 controlled at the top and bottom by valves to regulate the flow of fluid passing through certain of the ports when the piston is moved in one direction, and to regulate the flow of fluid passing through other of the ports when the piston is moved in the opposite direction.

A second piston 15 is slidably mounted to the extended end 16 of the piston rod 6 by way of the sleeve 17, the said sleeve is slidably mounted to the rod 16, the piston 15 being locked thereon by the locking nut 18. This piston has relatively small and heavy controlled valves or ports 19. The said piston and sleeve 17 are maintained on the extended rod 16 by the locking nut 20, which maintains the washer 21 against the shoulder on the end of the nut. Elastic bumpers 22 and 23 start the movement of the piston 15 at either end of its stroke, adding greater resistance.

In the operation of my new and improved shock absorber, the piston 11 having the relatively large ports and light valve control permits the same to operate through the fluid within the cylinder 24 with a relatively low resistance while the vehicle is travelling over smooth roads. The piston 15 standing or remaining approximately midway the length of the stroke of the extended piston rod 16, but when the road becomes rough and the piston rod 6 operates a relatively greater distance within the pressure tube 1, the extended piston rod 6 reaches the end of its stroke relative to the floating piston 15, it will move the said piston 15 through the fluid, and due to the fact that the ports 19 are relatively small and the valve action heavier, the movement of the piston rod 6 is slowed down or resisted to a greater extent while travelling over the road when rough.

Summing up my invention, it consists of the piston 11 operating within the fluid offering a relatively light resistance while the vehicle is travelling over smooth surfaces, but beyond this point when heavy spring movements of the vehicle take place over rough roads, the secondary piston 15 comes into operation, offering a greater resistance to the movement of the piston rod 6 within the pressure cylinder. The ports 14 and 19 in the respective pistons 11 and 15 may be of any size necessary to provide the desired relative difference in control action.

In Figure 2 I illustrate another preferred form of embodiment of invention, wherein the piston 25 is fixedly secured to the piston rod 6 by the locking nut 26. The said piston operating within a hollow floating piston 27. The floating piston 27 has relatively small fluid ports 28, while the piston 25 has relatively large ports therethrough and the associated valve mechanism not here shown.

Over the light roads, the piston 25 operates within the piston 27, the fluid passing through the ports 29 of the said piston relatively free, offering a light resistance, but when the roads become rough and the piston 25 reaches the end of its stroke within the piston 27, the piston 27 then moves within the pressure cylinder 1 by offering a greater resistance to the movement of the piston rod 6, due to the smaller ports 28 and its heavier valve control of the valve employed, thereby resisting the movement of the piston rod 6 and absorbing the shock offered by the rough road.

What I claim is:

1. A shock absorber of the type wherein a piston fixed on a rod and having valve ports therethrough is slidable in a cylinder through which the rod extends, the improvement comprising a second piston in said cylinder that is slidably mounted for limited movement on said rod and having valve ports therethrough which are more restricted than the ports in said first-mentioned piston, whereby excessive movement by said first-mentioned piston will cause movement of said second piston and the more restricted ports thereof will dampen movement of said first-mentioned piston.

2. A shock absorber, as defined in claim 1, wherein said second piston comprises a cylinder surrounding and cooperating with said first-mentioned piston.

3. A shock absorber, as defined in claim 1, wherein said second piston is limited in its movement by elastic bumpers on said rod.

4. A shock absorber, as defined in claim 1, wherein said second piston is mounted on an extended portion of said rod and said pistons are axially displaced and both engage said cylinder.

References Cited in the file of this patent

UNITED STATES PATENTS

| Number | Name | Date |
|---|---|---|
| 1,261,011 | Cook | Apr. 2, 1918 |

FOREIGN PATENTS

| Number | Country | Date |
|---|---|---|
| 987,786 | France | Aug. 20, 1951 |
| 705,634 | Germany | May 5, 1941 |